US011582616B2

(12) United States Patent
Yoo

(10) Patent No.: US 11,582,616 B2
(45) Date of Patent: Feb. 14, 2023

(54) DEVICE AND METHOD FOR SELECTING CELL IN WIRELESS COMMUNICATION SYSTEM

(71) Applicant: Samsung Electronics Co., Ltd., Suwon-si (KR)

(72) Inventor: Seungbo Yoo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/265,018

(22) PCT Filed: Aug. 2, 2019

(86) PCT No.: PCT/KR2019/009687
§ 371 (c)(1),
(2) Date: Feb. 1, 2021

(87) PCT Pub. No.: WO2020/027630
PCT Pub. Date: Feb. 6, 2020

(65) Prior Publication Data
US 2021/0314783 A1 Oct. 7, 2021

Related U.S. Application Data

(60) Provisional application No. 62/713,726, filed on Aug. 2, 2018.

(51) Int. Cl.
H04W 16/24 (2009.01)
H04W 48/16 (2009.01)
(52) U.S. Cl.
CPC .......... H04W 16/24 (2013.01); H04W 48/16 (2013.01)

(58) Field of Classification Search
CPC ..... H04W 16/24; H04W 48/16; H04W 24/02; H04W 24/10; H04W 88/08; H04W 72/04
See application file for complete search history.

(56) References Cited

U.S. PATENT DOCUMENTS

2013/0165124 A1 6/2013 Liang et al.
2015/0334769 A1 11/2015 Kim et al.
(Continued)

FOREIGN PATENT DOCUMENTS

JP 6343442 B2 6/2018
KR 10-2016-0108235 A 9/2016

OTHER PUBLICATIONS

Yin et al., General Architecture of Centralized Unit and Distributed Unit for New Radio,Shanghai Mar. 2012, China, Jun. 3, 2018.
(Continued)

Primary Examiner — Marcus Hammonds
(74) Attorney, Agent, or Firm — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). According to various embodiments of the present disclosure, a device of a base station in a wireless communication system includes at least one transceiver, and at least one processor, wherein the at least one processor may be configured to: acquire cell deployment information about a plurality of cells; identify a primary cell (PCell) on the basis of measurement information; identify a secondary cell (SCell) associated with the PCell on the basis of the cell deployment information; and set up the identified SCell.

11 Claims, 12 Drawing Sheets

(56) References Cited

U.S. PATENT DOCUMENTS

2016/0262118 A1    9/2016  Kim et al.
2018/0027562 A1    1/2018  Jeon et al.
2018/0368205 A1*  12/2018  Park ...................... H04W 76/34
2019/0053193 A1*   2/2019  Park ................... H04W 56/0045
2019/0215726 A1*   7/2019  Park ........................... H04L 1/08
2019/0380087 A1*  12/2019  Park ................... H04W 72/0413

OTHER PUBLICATIONS

3GPP TSG-RAN WG3 Meeting #97bis R3-173595, Prague, Czech Republic, Oct. 9-13, 2017.
3GPP TSG-RAN WG3 #100 R3-182540, Busan, South Korea, May 21-25, 2018.
3GPP TSG RAN WG2 Meeting #101 R2-1802398, Athens, Greece, Feb. 26-Mar. 2, 2018.
3GPP TSG-RAN WG3 #100 R3-183121, Busan, South Korea, May 21-25, 2018.

* cited by examiner

DEVICE AND METHOD FOR SELECTING CELL IN WIRELESS COMMUNICATION SYSTEM

BACKGROUND ART

The disclosure generally relates to a wireless communication system and, more specifically, to a device and method for selecting a cell in a wireless communication system.

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

DISCLOSURE OF INVENTION

Technical Problem

The disclosure provides a device and method for preventing an ineffective procedure and an abnormal case by providing a selection reference for a secondary cell (SCell) during carrier aggregation (CA) configuration in a wireless communication system.

Further, the disclosure provides a device and method for operating CA based on cell deployment information in a wireless communication system.

Further, the disclosure provides a device and method for performing SCell addition/modification/release based on cell deployment information in a wireless communication system.

Further, the disclosure provides a device and method for configuring a measurement report (MR) when selecting an SCell in a wireless communication system.

According to various embodiments of the disclosure, an operation method of a base station in a wireless communication system may include: acquiring cell deployment information of multiple cells; identifying, based on measurement information, a primary cell (PCell); identifying, based on the cell deployment information, a secondary cell (SCell) associated with the PCell; and configuring the identified SCell.

According to various embodiments of the disclosure, a device of a base station in a wireless communication system may include at least one transceiver and at least one processor, wherein the at least one processor may be configured to: acquire cell deployment information of multiple cells; identify, based on measurement information, a primary cell (PCell); identify, based on the cell deployment information, a secondary cell (SCell) associated with the PCell; and configure the identified SCell.

According to various embodiments of the disclosure, a device of a centralized unit (CU) of a base station in a wireless communication system may include at least one transceiver and at least one processor, wherein the at least one processor may be configured to: acquire cell deployment information of multiple cells from a distributed unit (DU) of the base station through an F1 setup procedure; identify, based on a measurement report transmitted from the DU, a primary cell (PCell); identify, based on the cell deployment information, a secondary cell (SCell) associated with the PCell; and configure the identified SCell, wherein the cell deployment information may include: identification information of each of the multiple cells; and information on whether coverages of the multiple cells overlap, and the SCell may be configured without a separate measurement configuration procedure for the SCell.

Advantageous Effects of Invention

A device and method according to various embodiments of the disclosure allows an appropriate secondary cell (SCell) to be selected in carrier aggregation (CA), thereby efficiently performing the CA.

Advantageous effects obtainable from the disclosure may not be limited to the above mentioned effects, and other effects which are not mentioned may be clearly understood, through the following descriptions, by those skilled in the art to which the disclosure pertains.

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the disclosure relates to a device and method for selecting a secondary cell (SCell) of carrier aggregation (CA) in a wireless communication system. Specifically, the disclosure describes a technology for selecting an SCell of CA, based on cell deployment in a wireless communication system.

Terms identifying information (e.g., control information, deployment information, cell information, cell deployment information, measurement information, and measurement configuration information), terms indicating network entities, terms indicating messages, terms indicating an interface between network entities, terms indicating an element of a device (modified appropriately according to the disclosure), and the like, which are used in the following description, are used as an example for convenience of description. Accordingly, the disclosure is not limited to the terms used below, and other terms having equivalent technical meanings may be used instead.

In addition, the disclosure will provide various embodiments described using terms used in some communication standards (e.g., $3^{rd}$ generation partnership project (3GPP), 5G, a long-term evolution (LTE) system, a new radio system), but this is only an example for description. Various embodiments of the disclosure may be easily modified and applied to other communication systems.

Figure 1:
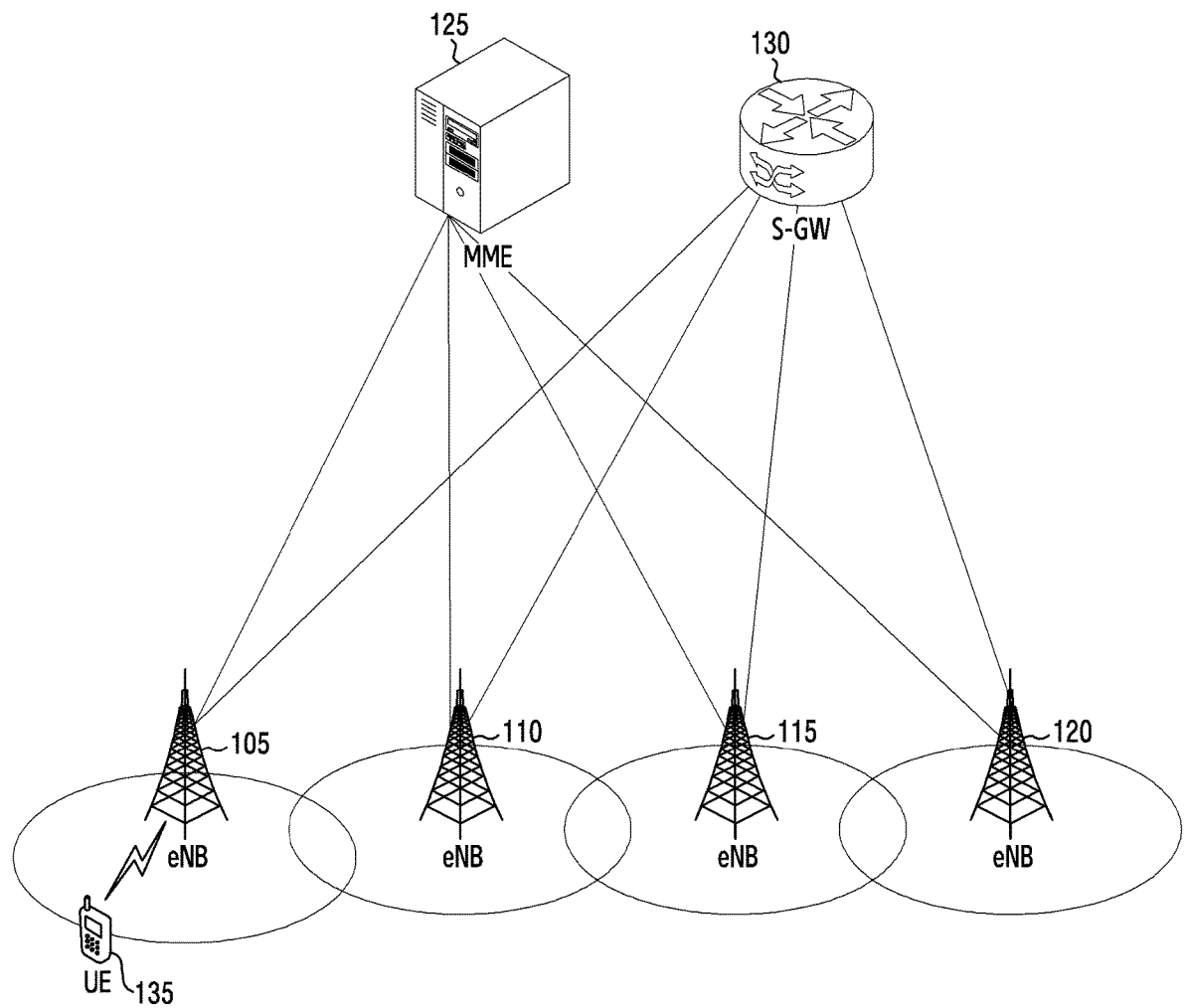
FIG. 1 illustrates an example of a wireless communication system according to various embodiments of the disclosure.

FIG. 1 illustrates an example of a wireless communication system according to various embodiments of the disclosure. The wireless communication system illustrated in FIG. 1 may include a system (e.g., an evolved packet system (EPS)) to which LTE is applied. Hereinafter, in the disclosure, the system to which LTE is applied may be referred to as an "LTE system". A cell of the LTE system may be referred to as an "LTE cell".

Referring to FIG. 1, a wireless access network of the LTE system may include next-generation base stations (evolved Node Bs, hereinafter, referred to as "eNBs", "Node Bs", or "base stations") 105, 110, 115, and 120, a mobility management entity (MME) 125, and a serving-gateway (S-GW) 130. A user equipment (hereinafter, referred to as a "UE" or a "terminal") 135 may access an external network through the eNBs 105 to 120 and the S-GW 130.

In FIG. 1, the eNBs 105 to 120 may correspond to the existing Node Bs of a universal mobile telecommunication system (UMTS). The eNB may be connected to the UE 135 via a radio channel, and may perform more complex functions than the existing Node B. In the LTE system, all user traffics including real-time services such as voice over Internet protocol (VoIP) may be serviced through a shared channel. Accordingly, a device for collecting state information, such as buffer state information of UEs, available transmission power state information of UEs, and channel state information of UEs, and performing scheduling is required, and each of the eNBs 105 to 120 may serve as such a device.

A single eNB may generally control multiple cells. For example, the LTE system uses a radio-access technology such as orthogonal frequency-division multiplexing (OFDM) in a bandwidth of 20 MHz to achieve a data rate of 100 Mbps. In addition, the LTE system may also apply an adaptive modulation & coding (AMC) scheme for determining a modulation scheme and a channel-coding rate in accordance with the channel state of a terminal. The S-GW 130 is a device for providing a data bearer, and may generate or release the data bearer under the control of the MME 125. The MME is a device for performing a mobility management function and various control functions for a terminal, and may be connected to multiple base stations.

Figure 2:
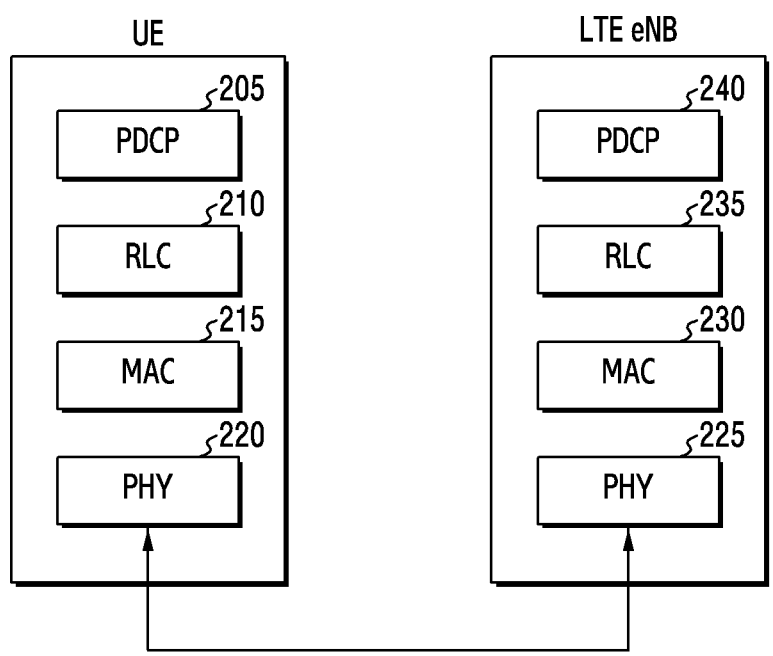
FIG. 2 illustrates an example of a radio protocol structure in a wireless communication system according to various embodiments of the disclosure.

FIG. 2 illustrates an example of a radio protocol structure in a wireless communication system according to various embodiments of the disclosure. The protocol structure described in FIG. 2 is a radio protocol structure in the LTE system.

Referring to FIG. 2, the radio protocol in the LTE system includes packet data convergence protocols (PDCPs) 205 and 240, radio link controls (RLCs) 210 and 235, and medium access controls (MACs) 215 and 230 in a terminal and an eNB, respectively. The PDCPs may perform operations of IP header compression/recovery and the like. The main function of the PDCP is summarized below:
  Header compression and decompression: ROHC only
  Transfer of user data
  In-sequence delivery of upper layer PDUs at PDCP re-establishment procedure for RLC AM
  For split bearers in DC (only support for RLC AM): PDCP PDU routing for transmission and PDCP PDU reordering for reception
  Duplicate detection of lower layer SDUs at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink.

The radio link controls (RLCs) 210 and 235 may reconfigure the PDCP packet data unit (PDU) at an appropriate size to perform an automatic repeat reQuest (ARQ) operation or the like. The main functions of the RLC are summarized below:
  Transfer of upper layer PDUs
  Error Correction through ARQ (only for AM data transfer)
  Concatenation, segmentation and reassembly of RLC SDUs (only for UM and AM data transfer)
  Re-segmentation of RLC data PDUs (only for AM data transfer)

Reordering of RLC data PDUs (only for UM and AM data transfer

Duplicate detection (only for UM and AM data transfer)

Protocol error detection (only for AM data transfer)

RLC SDU discard (only for UM and AM data transfer)

RLC re-establishment.

The MACs 215 and 230 are connected to several RLC layer devices configured in one terminal, and may perform an operation of multiplexing RLC PDUs into a MAC PDU and demultiplexing the RLC PDUs from the MAC PDU. The main functions of the MAC are summarized below:

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through HARQ Priority handling between logical channels of one UE Priority handling between UEs by means of dynamic scheduling MBMS service identification Transport format selection Padding Physical layers (PHYs) 220 and 225 may generate an OFDM symbol by performing channel-coding and modulating upper-layer data and transmit the same through a radio channel, or may perform demodulating and channel-decoding the OFDM symbol received through the radio channel and transmit the same to an upper layer.

Figure 3:
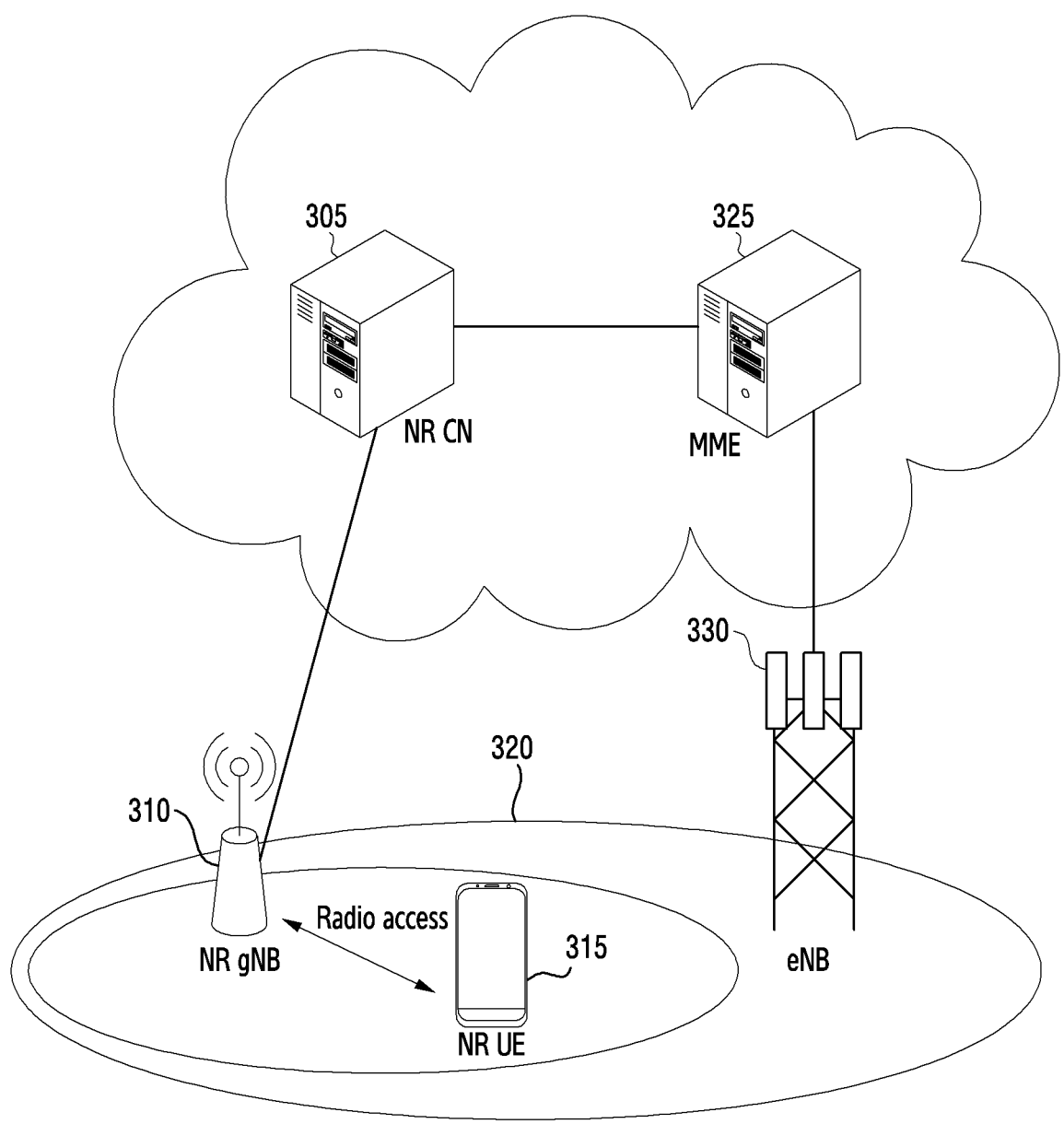
FIG. 3 illustrates another example of a wireless communication system according to various embodiments of the disclosure.

FIG. 3 illustrates another example of a wireless communication system according to various embodiments of the disclosure. The wireless communication system structure illustrated in FIG. 3 may include a system to which new radio (NR) is applied. According to an embodiment, the NR indicates a communication system in which higher data rate and high-reliability and/or low-latency data communication can be achieved when compared with the LTE. Hereinafter, in the disclosure, a system to which the NR is applied may be referred to as an "NR system", a "5G system", or a "next-generation mobile communication system". A cell in the NR system may be referred to as an "NR cell".

Referring to FIG. 3, a radio access network in the next-generation mobile communication system (hereinafter referred to as "new radio (NR)" or 5G) may include a new-radio node B (hereinafter, referred to as an "NR gNB" or an "NR base station") 310 and a new-radio core network (NR CN) 305. A new-radio user equipment (hereinafter, referred to as an "NR UE" or an "NR terminal") 315 may access an external network through the NR gNB 310 and the NR CN 305.

In FIG. 3, the NR gNB 310 may correspond to an evolved node B (eNB) in the existing LTE system. The NR gNB may be connected to the NR UE 315 through a radio channel, and thus may provide service superior to that of the existing node B. In the next-generation mobile communication system, all user traffic is serviced through shared channels in the next-generation mobile communication system. Accordingly, a device for collecting state information, such as buffer state information of UEs, available transmission power state information of UEs, and channel state information of UEs, and performing scheduling is required, and the NR NB 310 may serve as such a device. A single NR gNB may generally control multiple cells. In order to implement ultra-high-speed data transmission in the next-generation mobile communication system as compared with the existing LTE, a bandwidth that is equal to or higher than the existing maximum bandwidth may be applied. In addition, a beam-forming technology may be additionally combined using orthogonal frequency-division multiplexing (OFDM) as radio connection technology. In addition, an adaptive modulation & coding (AMC) scheme that determines a modulation scheme and a channel-coding rate in accordance with the channel state of the terminal may be applied.

The NR CN 305 may perform a function such as mobility support, bearer configuration, and quality of service (QoS) configuration. The NR CN is a device that performs not only terminal mobility management functions but also various types of control functions, and may be connected to multiple base stations. Further, the next-generation mobile communication system may be linked with the existing LTE system, and the NR CN may be connected to the MME 325 through a network interface. The MME is connected to an eNB 330, that is, the existing base station.

Figure 4:
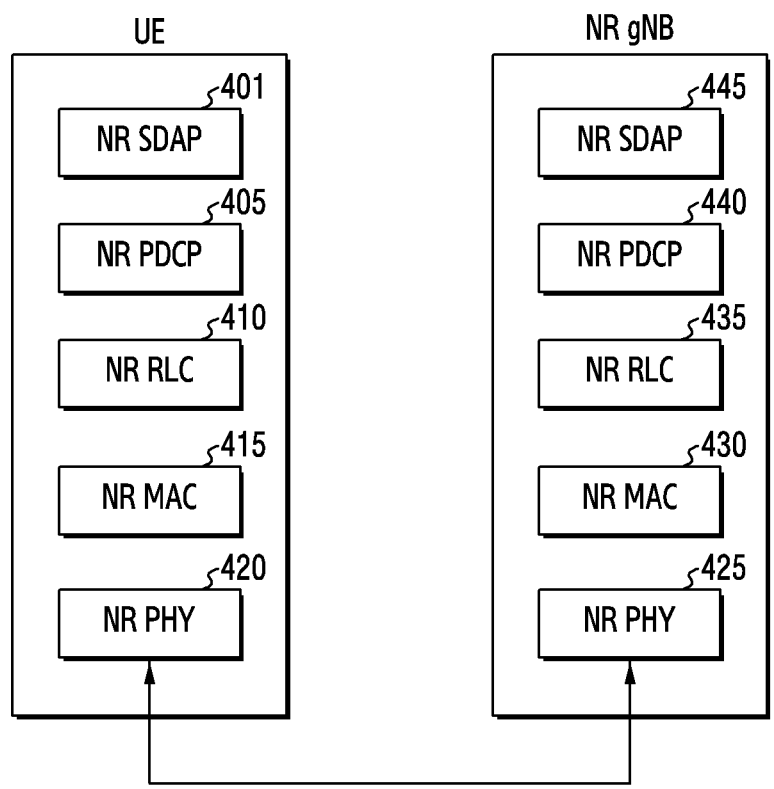
FIG. 4 illustrates another example of a radio protocol structure in a wireless communication system according to various embodiments of the disclosure.

FIG. 4 illustrates another example of a radio protocol structure in a wireless communication system according to various embodiments of the disclosure. The radio protocol structure illustrated in FIG. 4 may be a radio protocol structure of the NR system.

Referring to FIG. 4, in the radio protocol in the NR system, a terminal and an NR base station include NR service data adaptation protocols (SDAPs) 401 and 445, NR PDCPs 405 and 440, NR RLCs 410 and 435, NR MACs 415 and 430, and NR PHYs 420 and 425, respectively.

The main function of the NR SDPAs 401 and 445 may include some of the following functions:

Transfer of user plane data

Mapping between a QoS flow and a DRB for both DL and UL

Marking QoS flow ID in both DL and UL packets

Reflective QoS flow to DRB mapping for the UL SDAP PDUs.

For an SDAP-layer device, the terminal may receive, through a radio resource control (RRC) message, a configuration as to whether to use a header of the SDAP-layer device or to use a function of the SDAP-layer device function for each PDCP layer device, each bearer, or each logical channel. When an SDAP header is configured, the terminal may be indicated to update or reconfigure, with a non-access stratum (NAS) reflective QoS 1-bit indicator and an access stratum (AS) reflective QoS 1-bit indicator of the SDAP header, mapping information for uplink and downlink QoS flows and a data bearer. The SDAP header may include QoS flow ID information indicating the QoS. The QoS information may be used as data-processing priority, scheduling information, or like in order to support a smooth service.

The main functions of the NR PDCPs 405 and 440 may include some of the following functions:

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink.

In the above description, the reordering function of the NR PDCP device may refer to a function of sequentially rearranging PDCP PDUs received in a lower layer, based on a PDCP sequence number (SN). The reordering function of the NR PDCP device may include: a function of transferring data to an upper layer in the rearranged order; a function of directly transferring data without considering an order; a function of recording lost PDCP PDUs by rearranging an order; a function of reporting a state of the lost PDCP PDUs to a transmission end; and a function of requesting retransmission of the lost PDCP PDUs.

The main function of the NR RLCs 410 and 435 may include some of the following functions:

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment.

In the above description, the in-sequence delivery function of the NR RLC device may refer to a function of sequentially transferring RLC SDUs received from a lower layer, to an upper layer. When a single RLC SDU is divided into multiple RLC SDUs and the divided multiple RLC SDUs are received, the in-sequence delivery function of the NR RLC device may include a function of rearranging and transferring the same.

The in-sequence delivery function of the NR RLC device may include: a function of rearranging the received RLC PDUs, based on an RLC sequence number (SN) or a PDCP sequence number (SN); a function of recording lost RLC PDUs by rearranging an order; a function of reporting the state of the lost RLC PDUs to a transmission end; and a function of requesting retransmission of the lost RLC PDUs.

When there is a lost RLC SDU, the in-sequence delivery function of the NR RLC device 410 or 435 may include a function of sequentially transferring only RLC SDUs preceding the lost RLC SDU to the upper layer. In addition, when there is a lost RLC SDU but the timer expires, the in-sequency delivery function of the NR RLC device may include a function of sequentially transferring all RLC SDUs received before a predetermined timer starts to the upper layer. Furthermore, when there is a lost RLC SDU but the predetermined timer expires, the in-sequency delivery function of the NR RLC device may include a function of transferring all RLC SDUs received up to that point in time to the upper layer.

The NR RLC device 410 or 435 may process the RLC PDUs in the received order regardless of the order of serial numbers or sequence numbers, and may deliver the processed RLC PDUs to the NR PDCP device 405 or 440.

When the NR RLC device 410 or 435 receives a segment, the NR RLC may receive segments which are stored in a buffer or are to be received later, reconfigure the segments into one complete RLC PDU, and then deliver the same to the NR PDCP device.

The NR RLC layer may not include a concatenation function and may perform the function in the NR MAC layer or may replace the function with a multiplexing function of the NR MAC layer.

In the above description, the out-of-sequence delivery function of the NR RLC device may refer to a function of directly delivering, to the upper layer regardless of order, the RLC SDUs received from the lower layer. When a single RLC SDU is divided into multiple RLC SDUs and the divided multiple RLC SDUs are received, the out-of-sequence delivery function of the NR RLC device may include a function of rearranging and transferring the divided multiple RLC SDUs. The out-of-sequence delivery function of the NR RLC device may include a function of storing the PDCP SN or the RLC SN of each of the received RLC PDUs, arranging the RLC PDUs, and recording the lost RLC PDUs.

The NR MAC 415 and 430 may be connected to several NR RLC layer devices configured in one terminal, and the main functions of the NR MAC may include some of the following functions:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding NR Physical layers (NR PHYs) 420 and 425 may generate an OFDM symbol by performing channel-coding and modulating upper-layer data and transmit the same through a radio channel, or may perform demodulating and channel-decoding the OFDM symbol received through the radio channel and transmit the same to the upper layer.

Hereinafter, operations of a base station and a terminal in a wireless communication system are described in the disclosure. The base station may be referred to as an "access point (AP)", an "eNodeB (eNB)", a "5th generation (5G) node", a "wireless point", or another term having a technical meaning equivalent thereto. According to various embodiments, the base station may be connected to one or more "transmission/reception points (TRPs)". The base station may transmit a downlink signal or receive an uplink signal to or from the terminal through the one or more TRPs. Hereinafter, in the disclosure, the base station is described as an example of a network node for transmitting a radio signal to the terminal. However, the disclosure is not limited to the terms. The transmission of the radio signal may include a configuration in which the base station is connected to a TRP, and the TRP transmits the radio signal.

The terminal may be referred to as a "UE", an "NR UE", a "mobile station", a "subscriber station", a "customer premises equipment (CPE)", a "remote terminal", a "wireless terminal", an "electronic device", or another term having a technical meaning equivalent thereto.

A communication node (e.g., a terminal, a base station, and a core network entity) according to various embodiments of the disclosure may operate in the LTE system. In addition, a communication node (e.g., a terminal, a base station, and a core network entity) according to various embodiments of the disclosure may operate in the NR system. Furthermore, a communication node (e.g., a terminal, a base station, and a core network entity) according to various embodiments of the disclosure may operate in both the LTE system and the NR system. That is, the structure and layer description described in FIGS. 1 to 4 is merely an example, and one communication system may not exclude the other communication system.

Figure 5:
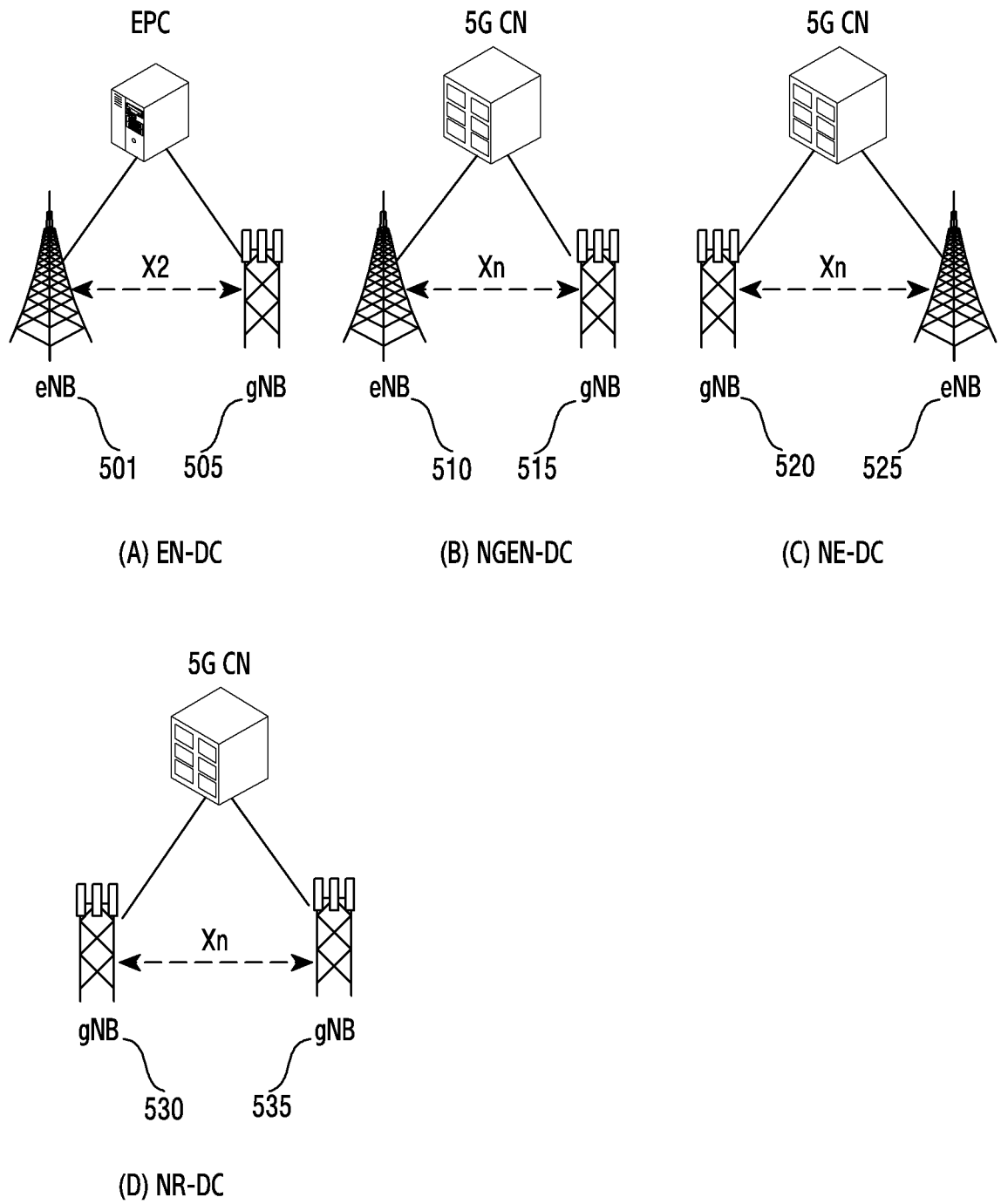
FIG. 5 illustrates examples of a network structure for supporting multi-radio access technology-dual connectivity (MR-DC) according to various embodiments of the disclosure.

FIG. 5 illustrates examples of a network structure for supporting multi-radio access technology-dual connectivity (MR-DC) according to various embodiments of the disclosure. The MR-DC is a scheme of forming dual connectivity between communication nodes forming an independent radio-access technology (RAT), various types thereof may be defined according to a wireless communication system (e.g., LTE or NR) supporting each of a master node (MN), a secondary node (SN), and a core network. Hereinafter, types of MR-CDC will be described.

Referring to FIG. 5, E-UTRA-NR dual connectivity (EN-DC) means that a terminal is connected to an LTE base station (eNB) 501 serving as an MN and an NR base station (gNB) 505 serving as an SN 505. Here, the LTE base station (eNB) is connected to an evolved packet core (EPC), and the NR base station (gNB) may or may not be connected the EPC. Therefore, according to whether the NR base station (gNB) is connected to the EPC, data transmission or reception to or from the terminal supporting EN-DC may be performed via an X2 interface, or data transmission or reception may be performed directly to or from the terminal.

NG-E-UTRA-NR dual connectivity (NGEN-DC) means that a terminal is connected to an LTE base station (eNB) 510 serving as an MN and an NR base station (gNB) 515 serving as an SN. Here, the LTE base station (eNB) is connected to a 5G CN, and the NR base station (gNB) may or may not be connected to the 5G CN. Therefore, according to whether the NR base station (gNB) is connected to the 5G CN, data transmission or reception to or from the terminal supporting NGEN-DC may be performed via an Xn interface, or data transmission or reception may be performed directly to or from the terminal.

NR-E-UTRA dual connectivity (NE-DC) means that a terminal is connected to an NR base station (gNB) 520 serving as an MN and an LTE base station (eNB) 525 serving as an SN. Here, the NR base station (gNB) is connected to a 5G CN, and the LTE base station (eNB) may or may not be connected to the 5G CN. Therefore, according to whether the LTE base station (eNB) is connected to the 5G CN, data transmission or reception to or from the terminal supporting NE-DC may be performed via an Xn interface, or data transmission or reception may be performed directly to or from the terminal.

NR-NR dual connectivity (NR-DC) means that a terminal is connected to an NR base station (gNB) 530 serving as an MN and an NR base station (gNB) 535 serving as an SN. Here, one NR base station (gNB) is connected to a 5G CN, and the other NR base station (gNB) may or may not be connected to the 5G CN. Therefore, according to whether the other NR base station (gNB) is connected to the 5G CN, data transmission or reception to or from the terminal supporting NR-DC may be performed via an Xn interface, or data transmission or reception may be performed directly to or from the terminal.

Figure 6:
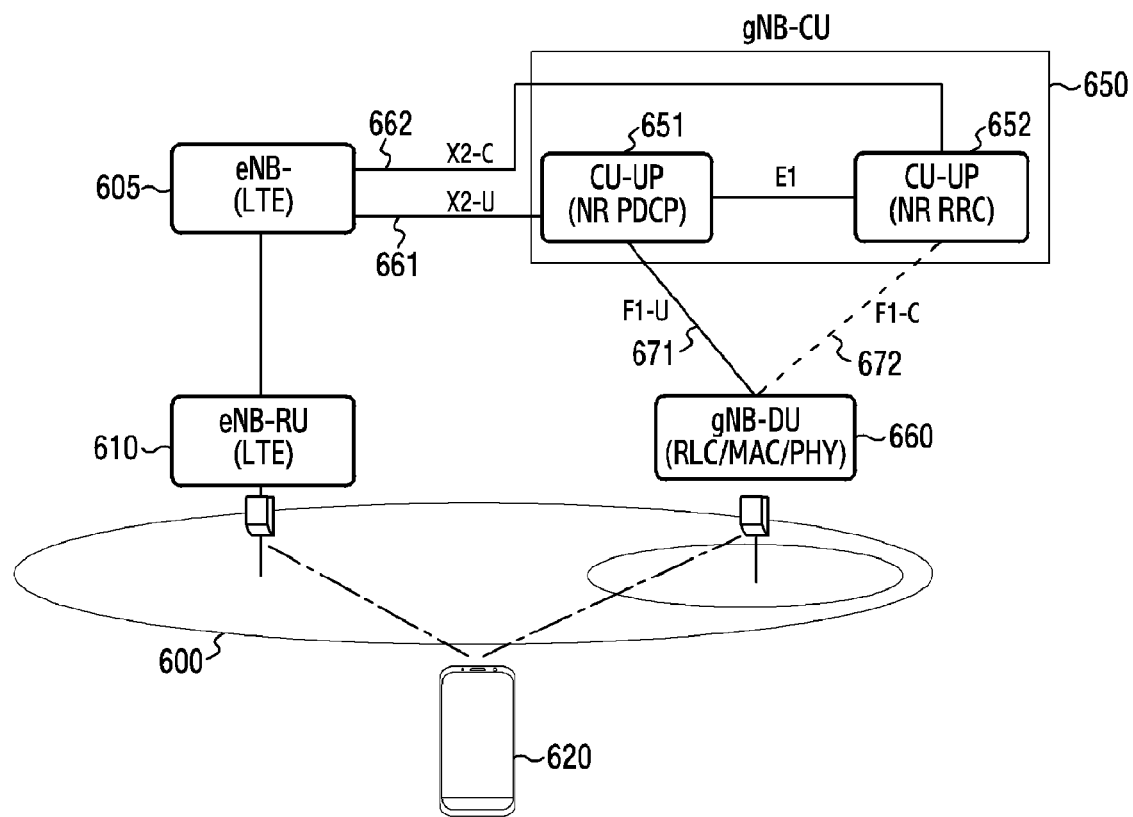
FIG. 6 illustrates an example of a network structure including a centralized unit (CU) and a distributed unit (DU) according to an embodiment of the disclosure.

FIG. 6 illustrates an example of a network structure including a centralized unit (CU) and a distributed unit (DU) according to an embodiment of the disclosure. The network structure in FIG. 6 illustrates a structure in which an eNB and a gNB in EN-DC are connected. A network environment in the EN-DC structure may include an LTE eNB base station and an NR gNB base station. The gNB base station may include a CU and a DU. The EN-DC is a structure for supporting dual-connectivity (DC) operation between LTE and NR, and CA may be performed in each of the LTE and NR base stations.

Referring to FIG. 6, in EN-DC, the LTE base station and the NR base station may be connected to each other through DC. The LTE base station may include a DU 605 and an RU 610. The DU 605 may provide a service through a core network. The RU 605 may provide a service through a radio-access network (RAN). The NR base station may include a CU 650 and a DU 660. The CU 650 may include a user plane (UP) 651 and a control plane (CP) 652. The user plane 651 may serve a function in the NR-PDCP layer. The control plane 652 may serve a function in the NR-RRC layer. The DU 650 may server functions in the RLC/MAC/PHY layers. The function in each of the layers is described in FIGS. 3 and 4.

The user plane 651 of the CU 650 may be connected to the LTE base station (e.g., the DU 605) through an X2-U interface. The control plane 652 of the CU 650 may be connected to the LTE base station (e.g., the DU 605) through an X2-C interface. The user plane 651 of the CU 650 may be connected to the DU 660 of the NR base station through an F1-U interface. The control plane 652 of the CU 650 may be connected to the DU 660 of the NR base station through an F1-C interface.

The terminal 620 may be connected to the corresponding base station in a radio-access network provided by the RU 610 of the LTE base station or the DU 660 of the NR base station. The terminal 620 may be connected to the base station through CA. The terminal 620 may transmit or receive a signal through a primary cell (PCell) of the CA. The terminal 620 may transmit or receive a signal through a secondary cell (SCell) of the CA. The terminal 620 may be connected to base stations through DC. The terminal 620 may transmit or receive a signal through a PCell of a master cell group (MCG) of the DC. The terminal 620 may transmit or receive a signal through a PCell of a secondary cell group (SCG) of the DC. The PCell of the SCG may be referred to as a "primary SCell (PSCell)". Further, the PCell of the MCG or the PSCell of the SCG may be referred to as an "SpCell".

The base station (e.g., the LTE eNB or NR gNB) is a network infrastructure for providing radio access to the terminal. The base station may be referred to as an "access point (AP)", an "eNodeB (eNB)", a "5th generation (5G) node (gNB)", a "wireless point", or another term having a technical meaning equivalent thereto. According to various embodiments, the base station may be connected to one or more "transmission/reception points (TRPs)". The base station may transmit a downlink signal to or receive an uplink signal from the terminal through the one or more TRPs. Hereinafter, in the disclosure, a base station supporting the LTE system is referred to as an "eNB base station", and a base station supporting the NR system is referred to as a "gNB base station".

Hereinafter, in the disclosure, a scheme of operating CA in a structure of a base station distributed into a CU and a DU is described. Various embodiments of the disclosure may be applied to a procedure of selecting an SCell during CA operation in the gNB base station in the NR system. Hereinafter, the disclosure takes an E-UTRA-NR dual connectivity (EN-DC) structure as an example, but may be applied to all structures in which CA is configured in a CU-DU structure. For example, various embodiments of the disclosure may be applied the same to the MR-DC types in FIG. 4. For example, various embodiments of the disclosure may be applied to the case in which CA is configured in the NR stand-alone (NR SA) system, or the case in which the NR-NR DC is performed.

Figure 7:
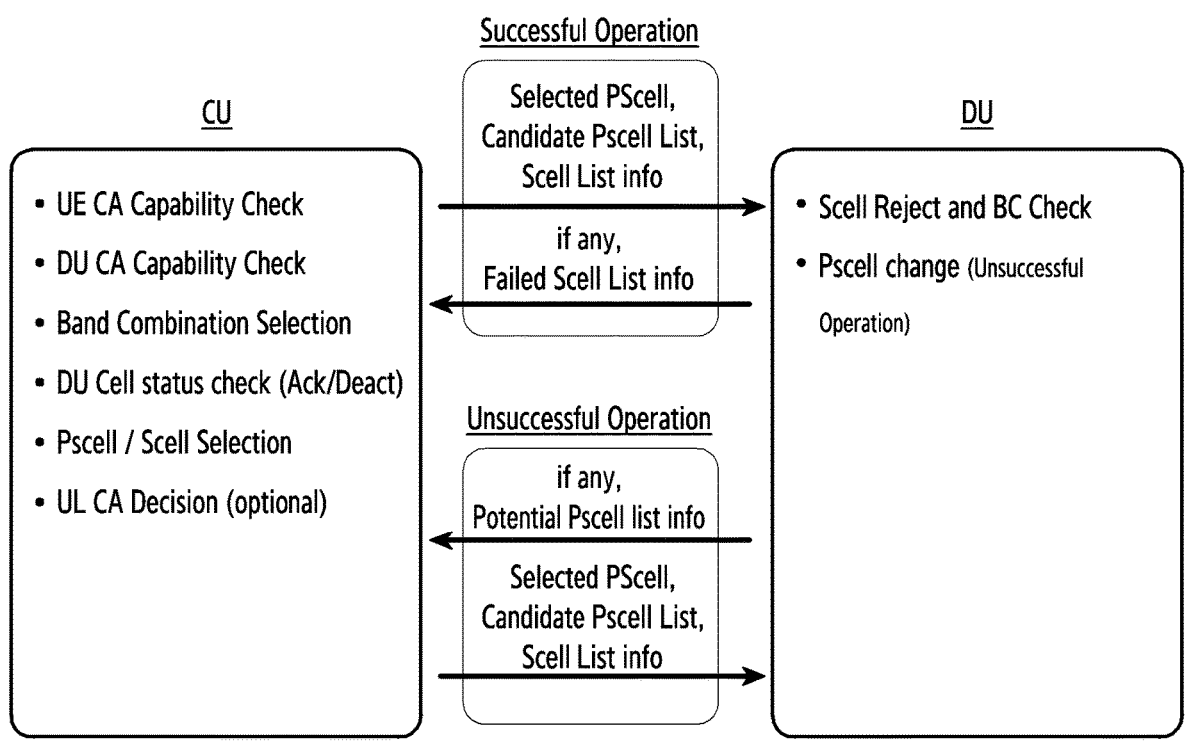
FIG. 7 illustrates an example of a CU-DU functional configuration according to an embodiment of the disclosure.

FIG. 7 illustrates an example of a CU-DU functional configuration according to an embodiment of the disclosure. The CU and the DU may perform a function such as configuration, check, or selection for CA operation by the terminal.

Referring to FIG. 7, the CU and the DU may exchange various types of information for a CA function. In addition, each of the CU and the DU may perform a function(s) for CA operation.

The CU may perform functions below:
UE CA capability check
DU CA capability check
Band combination selection
DU cell status check (activation/deactivation)
PCell, PSCell, or SCell selection
UL CA decision (optional)
The DU may perform functions below:
SCell reject and band combination check
PCell or PSCell change The CU and the DU may exchange various types of information according to a cell selection operation. In some embodiments, the CU may transmit information below to the DU.

Selected PCell or PSCell information
Candidate PCell (or PSCell) list
SCell list information In the case of a successful operation of cell selection, the DU may transmit, to the CU, information (e.g., failed SCell list info) relating to failed or unselected SCells. In the case of an unsuccessful operation of cell selection, the DU may transmit, to the CU, information relating to a potential candidate PCell (or PSCell) list. In response to the transmission of the potential candidate PCell (or PSCell) list, the CU may transmit again, to the DU, selected PCell or PSCell information, a PCell (or PSCell) candidate list, and SCell list information.

In a formation setup process between the CU and the DU, various embodiments of the disclosure may provide cell deployment information operated in the DU to the DU in order to clarify a selection scheme for an SCell at the time of CA configuration, thereby preventing an ineffective procedure or an abnormal case. That is, various embodiments of the disclosure provide a scheme of operating CA based on cell deployment information to be operated in the DU. Various embodiments of the disclosure provide a scheme of configuring CA based on cell deployment information to be operated in the DU. Various embodiments of the disclosure provide a scheme of selecting, based on cell deployment information to be operated in the DU, an SCell of CA. Various embodiments of the disclosure provide a scheme of configuring, based on cell deployment information, a measurement report (MR) at the time of SCell selection. Various embodiments of the disclosure select an appropriate S Cell of CA, thereby achieving efficient CA.

Figure 8:
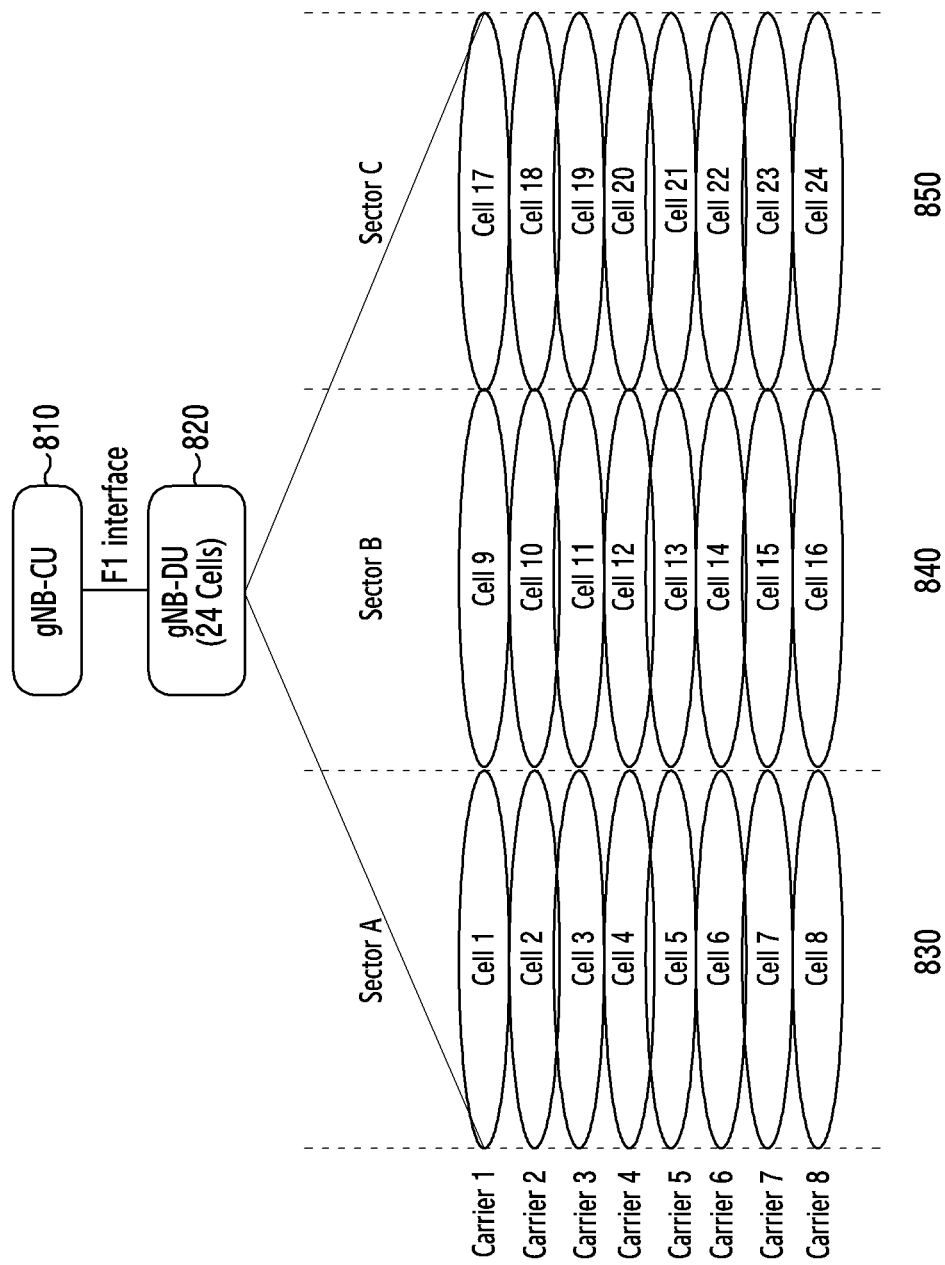
FIG. 8 illustrates an example of cells according to various embodiments of the disclosure.

FIG. 8 illustrates an example of cells according to various embodiments of the disclosure. The base station may provide cells. Here, the cell may indicate an area which can be covered by the base station. The base station may cover one cell or multiple cells. In this case, the multiple cells may be divided by a frequency for supporting the cells and a region of a sector for covering the cells. A serving cell is a cell which provides upper-layer signaling (e.g., radio resource control (RRC) signaling) with respect to the terminal, and may indicate one cell or multiple cells. When the terminal is not configured to support carrier aggregation (CA) or dual connectivity (DC), the serving cell may be one cell including a primary cell. When the terminal is configured to support the CA or the terminal, the serving cell may be a set of one or more cells including both a primary cell and one or more secondary cells. The base station may be the gNB base station of NR in FIGS. 3 and 4.

Referring to FIG. 8, the gNB base station may include a CU 810 and a DU 820. The CU 810 and the DU 820 may be connected to each other. The CU 810 and the DU 820 may exchange necessary information through an F1 interface. The DU 820 may provide multiple cells. For example, the DU 820 may support the maximum 512 cells. Generally, the cells may be configured in units of sectors at the time of initial installation. One sector may include multiple cells, and multiple cells may be deployed in each sector. That is, each sector may include multiple cells.

The DU 820 may operate 24 cells in three sectors. Sectors may be distinguished from each other according to a physical position. For convenience of description, it is assumed that all cells have the same radius, eight frequency bands exist in one sector, and one cell exists and is deployed for each frequency band. For example, the DU 820 may provide, in sector A 830, a first cell to an eighth cell corresponding to a first carrier to an eighth carrier, respectively. For example, the DU 820 may provide, in sector B 840, a ninth cell to a 16-th cell corresponding to the first carrier to the eighth carrier, respectively. The DU 820 may provide, in sector C 850, a 17-th cell to a 24-th cell corresponding to the first carrier to the eighth carrier, respectively.

The base station receives cell information according to an F1 setup procedure of the DU. For example, the cell information may include bandwidth information or frequency information. Later, the base station may receive a measurement report on the carrier. The base station may select an SpCell and an S Cell based on the measurement report. The base station may transmit information on the SpCell and the SCell to the DU. In this case, since the cell information includes no cell deployment information, it is not easy for the base station to select an SCell geographically associated with a PCell. This is because the frequency information has a less direct relevance to physical deployment. Accordingly, the CU of the base station may transmit relatively inappropriate SCell configuration to the DU. Since the SCell is physically distinguished from the PCell or the PSCell, measurement information (e.g., a measurement report, a measurement objection, and a measurement configuration) is to be separately configured, and thus relatively more time may be required. Therefore, in order to efficiently configure measurement information, when an SCell is selected, an SCell associated with the PSCell, for example, a co-located SCell needs to be selected. Hereinafter, according to various embodiments of the disclosure, a cell selection operation based on cell deployment information will be described in FIG. 9.

Figure 9:
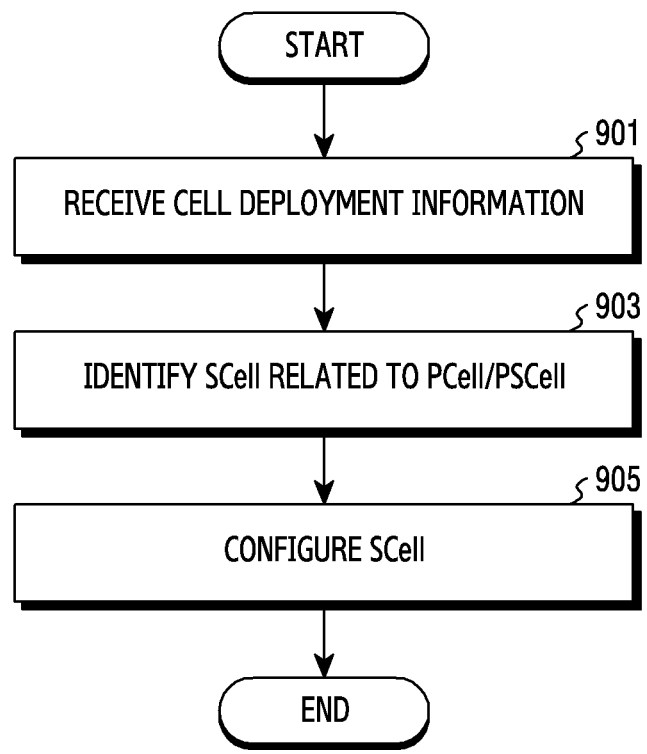
FIG. 9 illustrates operation flow of a base station according to various embodiments of the disclosure.

FIG. 9 illustrates operation flow of a base station according to various embodiments of the disclosure. The base station illustrates the gNB base station of FIGS. 3 and 4. The base station may include a CU and DU in a distributed network structure. Hereinafter, it is described that the CU performs the following operations, but some operations may be performed by the DU according to function sharing between the CU and the DU.

Referring to FIG. 9, in operation 901, the base station may receive cell deployment information. According to various embodiments, the cell deployment information may include information on physical deployment of a cell. The physical deployment may include a geographical position, relative deployment, the degree of overlapping between cells, cell formation, and the like.

In a CU-DU distributed deployment structure, the CU may receive cell deployment information as well as cell information from the DU through an F1 setup procedure. The cell deployment information may include information on overlapping between cells. The information on overlapping may include overlapping relationships between cells, that is, information on whether cells fully overlap, partially overlap, or fail to overlap.

The DU may provide multiple cells. Each cell may be indicated by a cell index. Based on each cell index, information on the cell deployment may be configured. Cell overlapping information for each cell index of the DU may be configured. The recording scheme of the cell overlapping information may be defined as follows with reference to each cell index configured for the DU.

Definition of "full overlap": This indicates the case in which a cell has a coverage overlapping a coverage of the corresponding cell, wherein the coverage of the cell is at least equal to or larger than that of the corresponding cell.

Definition of "partial overlap": This indicates the case in which a cell has a coverage overlapping at least a part of a coverage of the corresponding cell.

Definition of "non-overlap": This indicates the case in which a cell has no coverage overlapping a coverage of the corresponding cell.

Definition of "unknown": This indicates the case in which whether the corresponding cells overlap is unknown.

The cell deployment information may be provided by the DU to the CU through an F1 interface between the CU and the DU during the initial F1 interface setup (for example, an F1 setup procedure). The detailed information element (IE) in the procedure may be defined to have a format as shown in Table 1 and Table 2 below. The format below may be referenced together with (1) 3GPP TS 38.473 "$3^{rd}$ Generation Partnership Project; Technical Specification Group Radio Access Network; NG-RAN; F1 application protocol (FLAP)", and (2) 3GPP TS 38.331 "$3^{rd}$ Generation Partnership Project; Technical Specification Group Radio Access Network; NR; Radio Resource Control (RRC) protocol specification".

F1 Setup Request

The DU of the base station may transmit an F1 SETUP REQUEST message to the CU. The message may be transmitted to the CU by the DU in order to transfer information for transport network layer (TNL) association. The message may be configured as shown in Table 1 below.

TABLE 1

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| gNB-DU ID | M | | 9.3.1.9 | | YES | reject |
| gNB-DU Name | O | | Printable String(SIZE (1..150,...)) | | YES | ignore |
| gNB-DU Served Cells List | | 1 | | List of cells configured in the gNB-DU | YES | reject |
| >gNB-DU Served Cells Item | | 1..<maxCellingNBDU> | | | EACH | reject |
| >>Served Cell Information | M | | 9.3.1.10 | Information about the cells configured in the gNB-DU | — | — |
| >>gNB-DU System Information | O | | 9.3.1.18 | RRC container with system information owned by gNB-DU | — | — |

The serving cell information of the F1 SETUP REQUEST message may include cell configuration information relating to a cell in the DU. The cell configuration information may be configured as shown in Table 2 below.

TABLE 2

| IE/Group Name | Presence | Range | IE type and reference | Semantics description | Criticality | Assigned Criticality |
|---|---|---|---|---|---|---|
| NR CGI | M | | 9.3.1.12 | | — | — |
| NR PCI | M | | INTEGER (0..1007) | Physical Cell ID | | |

TABLE 2-continued

| IE/Group Name | Presence | Range | IE type and reference | Semantics description | Criticality | Assigned Criticality |
|---|---|---|---|---|---|---|
| 5GS TAC | M | | 9.3.1.29 | 5GS Tracking Area Code | YES | reject |
| Configured EPS TAC | O | | 9.3.1.29a | | — | |
| Served PLMNs | | 1..<maxnoof BPLMNs> | | Broadcast PLMNs | — | — |
| >PLMN Identity | M | | 9.3.1.14 | | — | — |
| >TAI Slice Support List | O | | Slice Support List 9.3.1.37 | Supported S-NSSAIs per TA. | YES | ignore |
| CHOICE NR-Mode-Info | M | | | | — | — |
| >FDD | | | | | | |
| >>FDD Info | | 1 | | | — | — |
| >>>UL Freqinfo | M | | NR Frequency Info 9.3.1.17 | | — | — |
| >>>DL Freqinfo | M | | NR Frequency Info 9.3.1.17 | | — | — |
| >>>UL Transmission Bandwidth | M | | NR Transmission Bandwidth 9.3.1.15 | | — | — |
| >>>DL Transmission Bandwidth | M | | NR Transmission Bandwidth 9.3.1.15 | | — | — |
| >TDD | | | | | — | — |
| >>TDD Info | | 1 | | | — | — |
| >>> NR FreqInfo | M | | NR Frequency Info 9.3.1.17 | | — | — |
| Transmission Bandwidth | M | | NR Transmission Bandwidth 9.3.1.15 | | — | — |
| Measurement Timing Configuration | M | | OCTET STRING | Contains the Measurement Timing Configuration inter-node message defined in TS 38.331 [8]. | — | — |
| RANAC | O | | 9.3.1.57 | RAN Area Code | YES | ignore |
| Cell DeploymentInfo | | | | | | |
| >FullOverlapcells | O | 1..<maxCelling NBDU> | | | | |
| >>NR CGI | M | | 9.3.1.12 | | | |
| >Partial Overlapcells | O | 1..<maxCelling NBDU> | | | | |

TABLE 2-continued

| IE/Group Name | Presence | Range | IE type and reference | Semantics description | Criticality | Assigned Criticality |
|---|---|---|---|---|---|---|
| >>NR CGI | M | | 9.3.1.12 | | | |
| >NonOverlapcells | O | 1.. <maxCelling NBDU | | | | |
| >>NR CGI | M | | 9.3.1.12 | | | |
| >Unknown Overlapcells | O | 1.. <maxCelling NBDU | | | | |
| >>NR CGI | M | | 9.3.1.12 | | | |

| Range bound | Explanation |
|---|---|
| maxnoofBPLMN s | Maximum no. of Broadcast PLMN Ids. Value is 6. |

In the above-described example, it is described that cell deployment information includes information relating to three stages which indicate that cells 1) fully overlap, 2) partially overlap, and 3) do not overlap (no overlap) according to the cell deployment information, or information relating to four stages including, in addition to the three operations, the case in which whether cells overlap is unknown. The stages indicate inclusion relationships between a coverage of a reference cell and a coverage of another cell. According to an embodiment, the inclusion relationships may be defined by two stages including an inclusive stage and a non-inclusive stage, instead of three or four stages. According to another embodiment, when cells partially overlap, additional stages may be defined according to the overlapping degree. That is, additional stages may be defined for the case in which cells 2) partially overlap, other than the case in which cells 1) fully overlap or 3) do not overlap (no overlap). When a cell overlaps a PCell (or a PSCell) by an overlapping degree equal to or greater than a reference, 2-1 stage may be additionally defined, and when a cell overlaps a PCell (or a PSCell) by an overlapping degree less than a reference, 2-2 stage may be additionally defined. In this case, the CU may configure different measurement configurations for each stage. For example, the CU may activate or add, as an SCell, a cell overlapping the PCell by the degree greater than the reference (e.g., 2-1 stage), and then may determine, through the MR, whether to maintain the corresponding cell as the SCell, or to release the cell from the SCell or remove the SCell. In another example, the CU may determine whether to activate or add, as an SCell, a cell overlapping the PCell by the degree less than the reference (e.g., 2-2 stage), or to release the cell from the SCell or remove the SCell later through the MR.

The CU of the base station may select an S Cell fully or partially covering the PCell (or the PSCell). The SCell may be configured without measurement configuration. Cells having non-inclusion relationships with the PCell may be subjected to SCell addition, activation, or removal later through the MR.

In the above-described example, whether cells overlap or whether cells partially overlap is described as an example of cell deployment information, but the cell deployment information may be defined in various ways. In some embodiments, the cell deployment information may include the degree of overlapping between two cells, that is, the degree of similarity between coverages of cells. The metric indicating coverages of cells may be defined. The cell deployment information may include information relating to the similarity between the metric of cells. For example, the cell deployment information may include information on a correlation between reference cell metric and another cell metric. According to the similarity between reference cell coverages, a reference cell and other cells may be classified into multiple groups. The cell deployment information may include information on cells classified into the multiple groups. The cell deployment information may include cell information classified into multiple groups. According to an embodiment, the CU may select a cell as an S Cell without measurement configuration even though the cell does not necessarily include the PCell. According to an embodiment, the metric may be determined according to statistics information. The statistics information may include statistical metric (e.g., RLF frequency, connected terminal frequency, a measurement result reported by the terminal, available beam information, etc.) related to coverages of cells. According to another embodiment, the metric may be determined by physical parameters, each of which indicates a coverage of each cell.

In other embodiments, the cell deployment information may include in sector formation other than cell information. By explicitly including the sector information, the CU may include an SCell co-located with a PCell (or a PSCell).

As described in the above example, the cell deployment information may be transmitted to the CU by the DU through an F1 interface between the CU and the DU. According to various embodiments, the IE relating to the cell deployment information may be included in the F1 SETUP REQUEST message and transmitted. In addition, according to various embodiments, the IE relating to the cell deployment information may be included in a DU configuration update message and transmitted. The DU configuration update message may include configuration information (e.g., a served cell information IE) relating to a cell in the DU. Further, according to various embodiments, a separate F1 message for transmitting cell deployment information may be defined, and the cell deployment information may be transmitted through the message.

In operation 903, the base station may identify an SCell related to a PCell/PSCell. The base station may identify a PCell or a PSCell, and then may identify an SCell based on the identified PCell or PSCell.

First, the base station may receive a measurement report. The base station may select a PCell or a PSCell based on the measurement report. The base station may receive the measurement report from the terminal. In the case of the distributed deployment, the CU of base station may receive the measurement report from the DU of the base station. According to the measurement report, the CU of the base station may identify a PCell, or select a PSCell of an SCG when the DC is configured. Later, the base station may select an SCell fully overlapping or partially overlapping the selected PCell or PSCell. The base station may select an SCell based on the cell deployment information. Hereinafter, when the SCell fully or partially overlaps the PCell or the PSCell, it may be represented that the SCell is co-located with the PCell or the PSCell. Since the base station selects an SCell geographically related to the PCell, the base station may select an SCell without additional measurement configuration for SCell addition/modification/deletion.

In operation 905, the base station may configure an SCell. The base station may configure the SCell selected in operation 903. In the case of the distributed deployment, the CU of the base station may transmit information on the selected SCell to the DU of the base station. The DU of the base station may activate the SCell by using information on the SCell. The base station may activate, through the DU without a separate measurement configuration, all SCells at once, the SCells fully or partially overlapping the PCell or the PS Cell.

The SCell selection based on the cell deployment information may be applied to various SCell operations other than a procedure (e.g., SCell activation) used for CA together with a PCell (or a PSCell) by using the selected cell. For example, the SCell selection based on the cell deployment of the disclosure may include at least one of releasing the selected cell from an SCell (SCell release), adding the selected cell as an SCell (SCell selection), and removing the selected cell (SCell release), and modifying the SCell (SCell modification).

The disclosure takes an CU-DU structure as an example, but may be expanded and applied to other types of scenarios. A cell selection scheme using cell deployment information according to various embodiments of the disclosure may be applied to a scenario in which an entity for selecting a cell (e.g., an SCell) and an entity for forming the cell are distinguished from each other.

Although not shown in FIG. 9, for SCell release or addition, the base station may configure measurement configuration for partially overlapping SCells. The base station may perform SCell addition/release/modification through information on the partially overlapping SCells.

Figure 10:
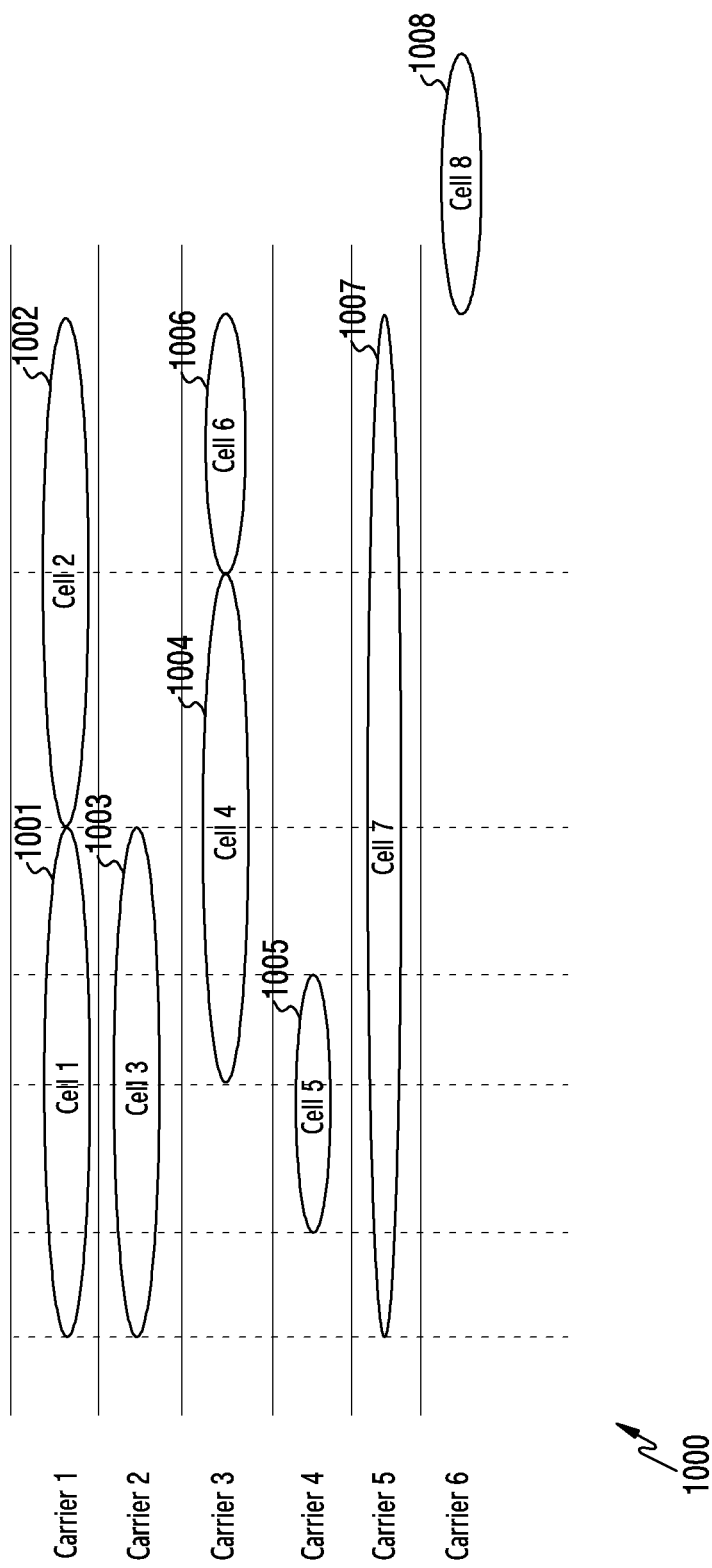
FIG. 10 illustrates an example of cell deployment according to various embodiments of the disclosure.

FIG. 10 illustrates an example of cell deployment according to various embodiments of the disclosure. The cell deployment may be indicated according to information on whether cells overlap.

Referring to FIG. 10, the DU may provide eight cells. The vertical axis in FIG. 10 indicates a carrier frequency. The eight cells may correspond to six carrier frequencies. A first cell 1001 may correspond to a first carrier frequency. A second cell 1002 may correspond to a first carrier frequency. A third cell 1003 may correspond to a second carrier frequency. A fourth cell 1004 may correspond to a third carrier frequency. A fifth cell 1005 may correspond to a fourth carrier frequency. A sixth cell 1006 may correspond to a third carrier frequency. A seventh cell 1007 may correspond to a fifth carrier frequency. An eighth cell 1008 may correspond to a sixth carrier frequency.

The horizontal axis in FIG. 10 indicates physical deployment, that is, a coverage. Cell deployment information relating to eight cells may be represented as shown in Table 3 below.

TABLE 3

| DU index | NCGI | Full overlap | Partial overlap | Non overlap |
|---|---|---|---|---|
| DU 1 | Cell 1 | 3, 7 | 4, 5 | 2, 6, 8 |
| | Cell 2 | 7 | 4, 6 | 1, 3, 5, 8 |
| | Cell 3 | 1, 7 | 4, 5 | 2, 6, 8 |
| | Cell 4 | 7 | 1, 2, 3, 5 | 6, 8 |
| | Cell 5 | 1, 3, 7 | 4 | 2, 6, 8 |
| | Cell 6 | 2, 7 | — | 1, 3, 4, 5, 8 |
| | Cell 7 | — | 1, 2, 3, 4, 5, 6 | 8 |
| | Cell 8 | — | — | 1, 2, 3, 4, 5, 6, 7 |

An NR cell global identifier (NCGI) may indicate each cell. "Full overlap" indicates a cell including a coverage of the corresponding cell and having a coverage at least equal to or greater than that of the corresponding cell. "Partial overlap" indicates a cell overlapping at least a part of a coverage of the corresponding cell. "Non-overlap" indicates a cell having no coverage overlapping the coverage of the corresponding cell. Although not shown in Table 3, the cell deployment information may also include an item for the unknown case.

According to various embodiments, a base station (e.g., a gNB) may activate an SCell in fully overlapping cells without measurement configuration in consideration of the cell deployment information. The measurement configuration may be configured in consideration of the cell deployment information. The measurement configuration includes configuration relating to a measurement report. According to an embodiment, the base station (gNB-CU) may select partially overlapping cells and then perform, based on the measurement report (MR), SCell release of the corresponding cell. According to another embodiment, the base station (gNB-CU) may not consider the partially overlapping cells and then perform, based on the measurement report (MR), SCell addition of the corresponding cell.

Figure 11:
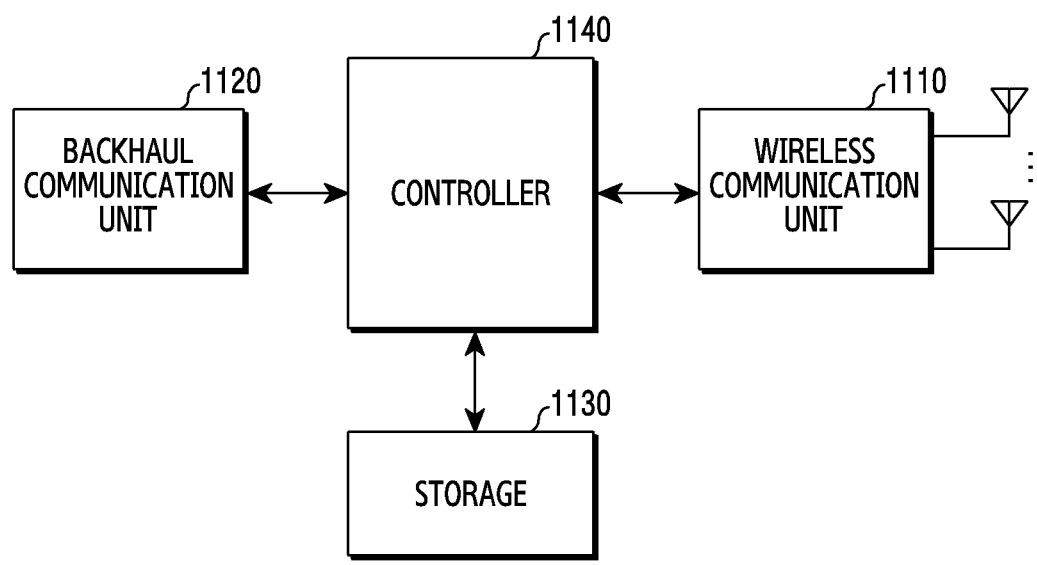
FIG. 11 illustrates a functional configuration of a base station according to various embodiments of the disclosure.

FIG. 11 illustrates a configuration of a base station in a wireless communication system according to various embodiments of the disclosure. The configuration exemplified in FIG. 11 may be understood as a configuration of a base station. The terms "-unit", "-er(or)", or the like, which will be used below, denote a unit for processing at least one function or operation, and may be implemented by hardware, software, or a combination thereof.

Referring to FIG. 11, the base station includes a wireless communication unit 1110, a backhaul communication unit 1120, a storage 1130, and a controller 1140. In some embodiments, the base station may include a CU and a DU. The base station may include one CU and one or more DUs. The DU may transmit a signal or receive a signal to or from the terminal through the wireless communication unit.

The wireless communication unit 1110 performs functions of transmitting or receiving a signal through a radio channel. For example, the wireless communication unit 1110 performs a function of conversion between a baseband signal and a bitstream according to the physical layer specifications of a system. For example, during data transmission, the wireless communication unit 210 generates complex symbols by encoding and modulating a transmission bitstream. In addition, during data reception, the wireless communication unit 1110 reconstructs a received bitstream by demodulating and decoding a baseband signal. Furthermore, the wireless communication unit 1110 up-converts a baseband signal into a radio frequency (RF)-band signal and then transmits the RF-band signal through an antenna, and down-converts an RF-band signal received through an antenna into a baseband signal.

To this end, the wireless communication unit 1110 may include a transmission filter, a reception filter, an amplifier, a mixer, an oscillator, a digital-to-analog converter (DAC), an analog-to-digital converter (ADC), and the like. Further, the wireless communication unit 1110 may include multiple transmission or reception paths. In addition, the wireless communication unit 1110 may include at least one antenna array including multiple antenna elements. In terms of hardware, the wireless communication unit 1110 may include a digital unit and an analog unit, and the analog unit may include multiple sub-units according to operating power, operating frequency, or the like. According to various embodiments, the wireless communication unit 1110 may include a unit for forming a beam, that is, a beamforming unit. For example, the wireless communication unit 1110 may include a massive MIMO unit (MMU) for beamforming.

The wireless communication unit 1110 may transmit or receive a signal. To this end, the wireless unit 1110 may include at least one transceiver. For example, the wireless communication unit 1110 may transmit a synchronization signal, a reference signal, system information, a message, control information, data, or the like. Furthermore, the wireless communication unit 1110 may perform beamforming. The wireless communication unit 1110 may apply a beamforming weight to a signal in order to assign directivity to a signal to be transmitted or received according to the configuration of the controller 1140. According to an embodiment, the wireless communication unit 1110 may generate a baseband signal according to the scheduling result and the transmission power calculation result. In addition, an RF unit in the wireless communication unit 111 may transmit a generated signal through an antenna.

As described above, the wireless communication unit 1110 transmits and receives a signal. Accordingly, some or all of the wireless communication unit 1110 may be referred to as a "transmitter", a "receiver", or a "transceiver". In addition, in the following description, transmission and reception performed through a radio channel is used to have a meaning including the processing performed by the wireless communication unit 1110 as described above.

The backhaul communication unit 1120 provides an interface for performing communication with other nodes in the network. That is, the backhaul communication unit 1120 converts a bitstream transmitted from the base station 110 to another node, for example, another access node, another base station, a higher node, a core network, or the like, into a physical signal, and converts a physical signal received from another node into a bitstream. In some embodiments, the backhaul communication unit 1120 may be included in the CU of the base station.

The storage 1130 stores a basic program for operating a base station 110, an application program, and data such as configuration information. The storage 1130 may include memory. The storage 1130 may include volatile memory, nonvolatile memory, or a combination of volatile memory and nonvolatile memory. The storage 1130 provides stored data upon a request from the controller 1140. According to an embodiment, the storage 1130 may include a terminal information management unit including information relating to a terminal. The terminal information may include channel information, average capacity information, and data to be transmitted of each terminal.

The controller 1140 controls the overall operation of the base station. For example, the controller 1140 may transmit and receive a signal through the wireless communication unit 1110 or the backhaul communication unit 1120. In addition, the controller 1140 records data in the storage 1130 and reads the recorded data therefrom. The controller 1140 may perform functions of a protocol stack required by a communication standard. To this end, the controller 1140 may include at least one processor. According to various embodiments, the controller 1140 may include a cell selection unit. The cells selection unit may perform SCell selection based on cell deployment information received from the DU. In addition, the cell selection unit may perform PCell selection based on measurement information. Here, the cell selection unit may be, as a command set or code stored in the storage 1130, a command/code which at least temporally resides in the controller 1140, a storage space in which a command/code is stored, or a part of the circuitry constituting the controller 1140. Meanwhile, according to another embodiment, a scheduler and a transmission power calculator may be independently implemented in individual apparatuses, respectively. According to various embodiments, the controller 1140 may control the base station to perform operations according to the above-described various embodiments.

In FIG. 11, the base station is described with reference to one entity, but the disclosure is not limited thereto. The base station according to various embodiments of the disclosure may be implemented to form an access network having not only integral deployment, but also distributed deployment as described in FIGS. 6 to 10. According to an embodiment, the base station may be divided into a central unit (CU) and a digital unit (DU) and may be implemented so that the CU performs upper-layer functions (e.g., a packet data convergence protocol (PDCP) and RRC) and the DU performs lower-layer functions (e.g., medium access control (MAC) and physical (PHY)). The DU of the base station may form beam coverage on a radio channel.

Figure 12:
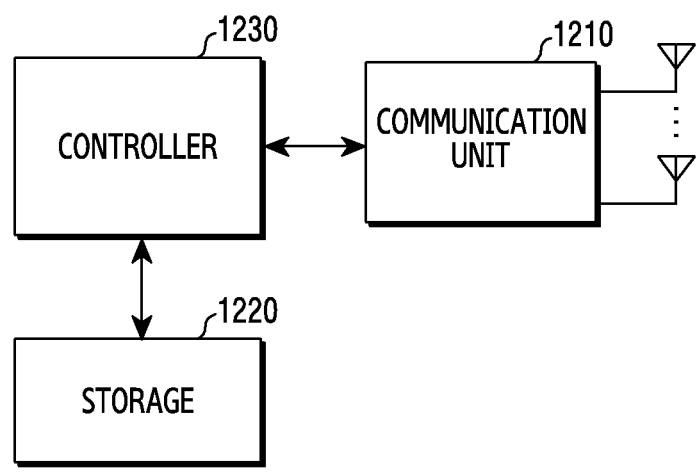
FIG. 12 illustrates a functional configuration of a terminal according to various embodiments of the disclosure.

FIG. 12 illustrates a configuration of a terminal in a wireless communication system according to various embodiments of the disclosure. The configuration exemplified in FIG. 12 may be understood as a configuration of a terminal. The terms "-unit", "-er(or)", or the like, which will be used below, denote a unit for processing at least one function or operation, and may be implemented by hardware, software, or a combination thereof.

Referring to FIG. 12, the terminal 620 includes a communication unit 1210, a storage 1220, and a controller 1230.

The communication unit 1210 performs functions of transmitting or receiving a signal through a radio channel. For example, the communication unit 1210 performs a function of conversion between a baseband signal and a bitstream according to the physical layer specifications of a system. For example, during data transmission, the communication unit 1210 generates complex symbols by encoding and modulating a transmission bitstream. In addition, during data reception, the communication unit 1210 reconstructs a received bitstream by demodulating and decoding a baseband signal. Furthermore, the communication unit 1210 up-converts a baseband signal into a radio frequency (RF)-band signal and then transmits the RF-band signal through an antenna, and down-converts an RF-band signal received through an antenna into a baseband signal. For example, the communication unit 1210 may include a transmission filter, a reception filter, an amplifier, a mixer, an oscillator, a DAC, an ADC, and the like.

Further, the communication unit 1210 may include multiple transmission or reception paths. Furthermore, the communication unit 1210 may include an antenna unit. The communication unit 1210 may include at least one antenna array including multiple antenna elements. In terms of hardware, the communication unit 1210 may include a digital circuit and an analog circuit (e.g., a radio frequency integrated circuit (RFIC)). Here, the digital circuit and the analog circuit may be implemented in a single package. Further, the communication unit 1210 may also include multiple RF chains. The communication unit 1210 may perform beamforming. The communication unit 1210 may apply a beamforming weight to a signal in order to assign directivity to a signal to be transmitted or received according to the configuration of the controller 1230. According to an embodiment, the communication unit 1210 may include a radio frequency (RF) block (or an RF unit). The RF block may include a first RF circuitry related to an antenna and a second RF circuitry related to baseband processing. The first RF circuitry may be referred to as an "RF-antenna (A)". The second RF circuitry may be referred to as an "RF-baseband (B)".

Further, the communication unit 1210 may transmit or receive a signal. To this end, the communication unit 1210 may include at least one transceiver. The communication unit 1210 may receive a downlink signal. The downlink signal may include a synchronization signal (SS), a reference signal (RS) (e.g., a cell-specific reference signal (CRS) and a demodulation (DM)-RS), system information (e.g., an MIB, an SIB, remaining system information (RMSI), other system information (OSI)), a configuration message, control information, downlink data, or the like. Further, the communication unit 1210 may transmit an uplink signal. The uplink signal may include a random access-related signal (e.g., a random-access preamble (RAP) (or message 1 (Msg1) or message 3 (Msg3)), a reference signal (e.g., a sounding reference signal (SRS) and a DM-RS), a power headroom report (PHR), or the like.

In addition, the communication unit 1210 may include different communication modules in order to process signals of different frequency bands. Further, the communication unit 1210 may include multiple communication modules to support different multiple radio-access techniques. For example, different radio-access techniques may include Bluetooth low energy (BLE), Wi-Fi, Wi-Fi gigabyte (WiGig), and a cellular network (e.g., long term evolution (LTE) and new radio (NR)). Further, the different frequency bands may include a super-high frequency (SHF) (e.g., 2.5 GHz and 5 GHz) band and a millimeter (mm) wave (e.g., 38 GHz, 60 GHz, etc.) band. Further, the communication unit 1210 may use the same type of radio-access technology on an unlicensed band for different frequency bands (e.g., a licensed assisted access (LAA)) and citizens broadband radio service (CBRS) (e.g., 3.5 GHz)).

As described above, the communication unit 1210 transmits and receives a signal. Accordingly, some or all of the communication unit 1210 may be referred to as a "transmitter", a "receiver", or a "transceiver". In addition, hereinafter, transmission and reception performed through a radio channel are used to have a meaning including the processing performed by the communication unit 1210 as described above.

The storage 1220 stores a basic program for operating a terminal, an application program, and data such as configuration information. The storage 1220 may include volatile memory, nonvolatile memory, and a combination of volatile memory and nonvolatile memory. The storage 1220 provides stored data upon a request from the controller 1230. According to various embodiments, the storage 1220 may store direction information on each beam of the beam set or auxiliary beam pair to be operated in the terminal.

The controller 1230 controls the overall operation of the terminal. For example, the controller 1230 transmits and receives a signal through the communication unit 1210. In addition, the controller 1230 records data in the storage 1220 and reads the recorded data therefrom. The controller 1230 may perform the functions of a protocol stack required by the communication standard. To this end, the controller 1230 may include at least one processor. The controller 1230 may include at least one processor or a micro-processor, or may be a part of a processor. Further, a part of the communication unit 1210 and the controller 1230 may be referred to as a communication processor (CP). The controller 1230 may include various modules for performing communication. According to various embodiments, the controller 1230 may control the terminal to perform operations according to various embodiments to be described below.

According to various embodiments, a base station (e.g., a gNB-CU) may determine whether measurement configuration information relating to a cell in consideration of cell deployment information. For example, the baes station may configure, to be an SCell, a cell having the higher similarity with a PCell or a cell including the coverage of the PCell (e.g., full overlap), without measurement configuration information. In another example, when a cell has the lower similarity with the PCell, the base station may not generate measurement configuration information on the corresponding cell and may configure the cell to be an SCell. In another example, the base station may configure, to be an SCell, a cell determined to have the higher similarity with a PCell, and then determine whether to activate/release/add an SCell later through the measurement configuration information. In another example, the base station may operate measurement configuration for cells having the particular range of similarity with a PCell or cells are in the range of overlapping with the PCell. The base station may determine whether to add or activate an SCell through an MR for each cell.

In the above-described example, it is described that there are three stages of full overlap, partial overlap, and non-overlap, but the disclosure is not limited thereto. According to some other embodiments, multiple levels (or stages) may be defined according to the degree of overlapping. For example, according to the size of a partial overlap area, additional stages may be defined. According to an embodiment, based on the degree of overlapping, the base station may differently configure measurement configuration. According to various embodiments, a group to which each cell belongs may be determined according to the degree of overlapping. Here, a reference range of the degree of overlapping may be predetermined.

In the disclosure, a scheme of utilizing cell deployment information when selecting an SCell after PSCell selection in the EN-DC structure is described. As described above, in order to describe a CA operation scheme of the disclosure, an example of the EN-DC is described, but the disclosure is not limited to the EN-DC. In some embodiments, SCell selection based on cell deployment information may be applied to DC between NR and NR. In addition, in some embodiments, SCell selection based on cell deployment information may be applied to CA of a gNB base station in an NR stand-along system.

The base station may select a PCell, based on an MR. The base station may select an SCell, based on cell deployment information. Here, the Scell may be a cell fully overlapping or partially overlapping with the PCell. In distributed deployment, the CU of the base station may transmit configuration or the selected SCell to the DU. The DU may activate the SCell without measurement configuration (e.g., fully overlapping cells), or may effectively add or release, based on additional measurement (e.g., partially overlapping cells), the Scell.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The invention claimed is:

1. An operation method of a base station in a wireless communication system, the method comprising:
    acquiring physical cell deployment information of multiple cells, the physical cell deployment information including information on a degree of overlapping between a coverage of a cell and a coverage of another cell;
    identifying, based on measurement information, a primary cell (PCell);
    identifying, based on the degree of overlapping, a secondary cell (SCell) associated with the PCell, without measurement configuration for the SCell; and
    configuring the identified SCell.

2. The method of claim 1,
    wherein the multiple cells comprise a first cell and a second cell, and
    wherein the information on the degree of overlapping comprises information indicating one of whether the first cell has a coverage fully comprising a coverage of the second cell, whether the first cell has a coverage partially overlapping a coverage of the second cell, or whether the first cell has no coverage overlapping a coverage of the second cell.

3. The method of claim 1,
    wherein the cell deployment information is acquired from a distributed unit (DU) of the base station by a centralized unit (CU) of the base station through an F1 setup procedure,
    wherein the identified PCell is provided by the DU, and
    wherein the cell deployment information comprises:
        identification information of each cell provided by the DU, and
        information on whether coverages of cells provided by the DU overlap.

4. The method of claim 3,
    wherein the SCell is configured by SCell addition or SCell modification, and
    wherein the measurement information comprises a measurement report received through the DU.

5. The method of claim 1, wherein the identifying of the SCell comprises:
    identifying, based on the degree of overlapping, candidate cells deployed at a position physically associated with the PCell; and
    identifying an SCell among the candidate cells.

6. A device of a base station in a wireless communication system, the device comprising:
    at least one transceiver; and
    at least one processor,
    wherein the at least one processor is configured to:
        acquire physical cell deployment information of multiple cells, the physical cell deployment information including information on a degree of overlapping between a coverage of a cell and a coverage of another cell,
        identify, based on measurement information, a primary cell (PCell),
        identify, based on the degree of overlapping, a secondary cell (SCell) associated with the PCell, without measurement configuration for the SCell, and
        configure the identified SCell.

7. The device of claim 6,
    wherein the multiple cells comprise a first cell and a second cell, and
    wherein the information on the degree of overlapping comprises information indicating one of whether the first cell has a coverage fully comprising a coverage of the second cell, whether the first cell has a coverage partially overlapping a coverage of the second cell, or whether the first cell has no coverage overlapping a coverage of the second cell.

8. The device of claim 6,
    wherein the cell deployment information is acquired from a distributed unit (DU) of the base station by a centralized unit (CU) of the base station through an F1 setup procedure, wherein the identified PCell is provided by the DU, and
wherein the cell deployment information comprises:
  identification information of each cell provided by the DU, and
  information on whether coverages of cells provided by the DU overlap.

9. The device of claim 8,
wherein the SCell is configured by SCell addition or SCell modification, and
wherein the measurement information comprises a measurement report received through the DU.

10. The device of claim 6, wherein, in order to identify the SCell, the at least one processor is further configured to:
  identify, based on the degree of overlapping, candidate cells deployed at a position physically associated with the PCell; and
  identify an SCell among the candidate cells.

11. A device of a centralized unit (CU) of a base station in a wireless communication system, the device comprising:
  at least one transceiver; and
  at least one processor,
  wherein the at least one processor is configured to:
    acquire physical cell deployment information of multiple cells from a distributed unit (DU) of the base station through an F1 setup procedure, the physical cell deployment information including information on a degree of overlapping between a coverage of a cell and a coverage of another cell,
    identify, based on a measurement report transmitted from the DU, a primary cell (PCell),
    identify, based on the degree of overlapping, a secondary cell (SCell) associated with the PCell, without measurement configuration for the SCell, and
    configure the identified SCell,
  wherein the cell deployment information comprises:
    identification information of each of the multiple, and
    information on whether coverages of the multiple cells overlap, and
  wherein the SCell is configured without a separate measurement configuration procedure for the SCell.

* * * * *